Figure 4:
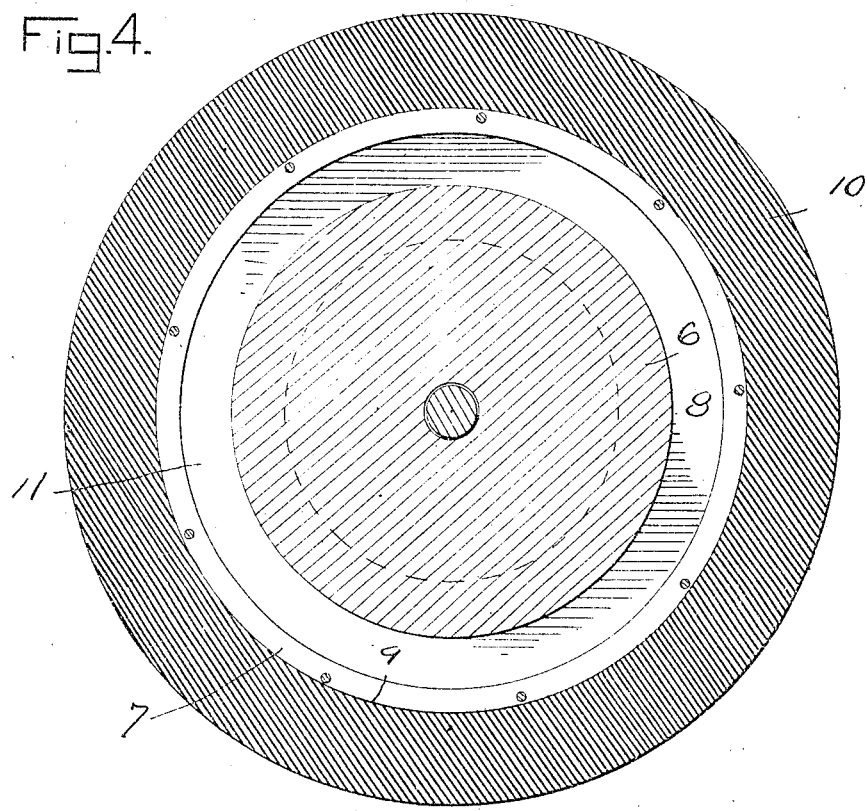

No. 882,348. PATENTED MAR. 17, 1908.
H. E. SCHINDLER.
SPRING WHEEL.
APPLICATION FILED JULY 6, 1907.
2 SHEETS—SHEET 1.
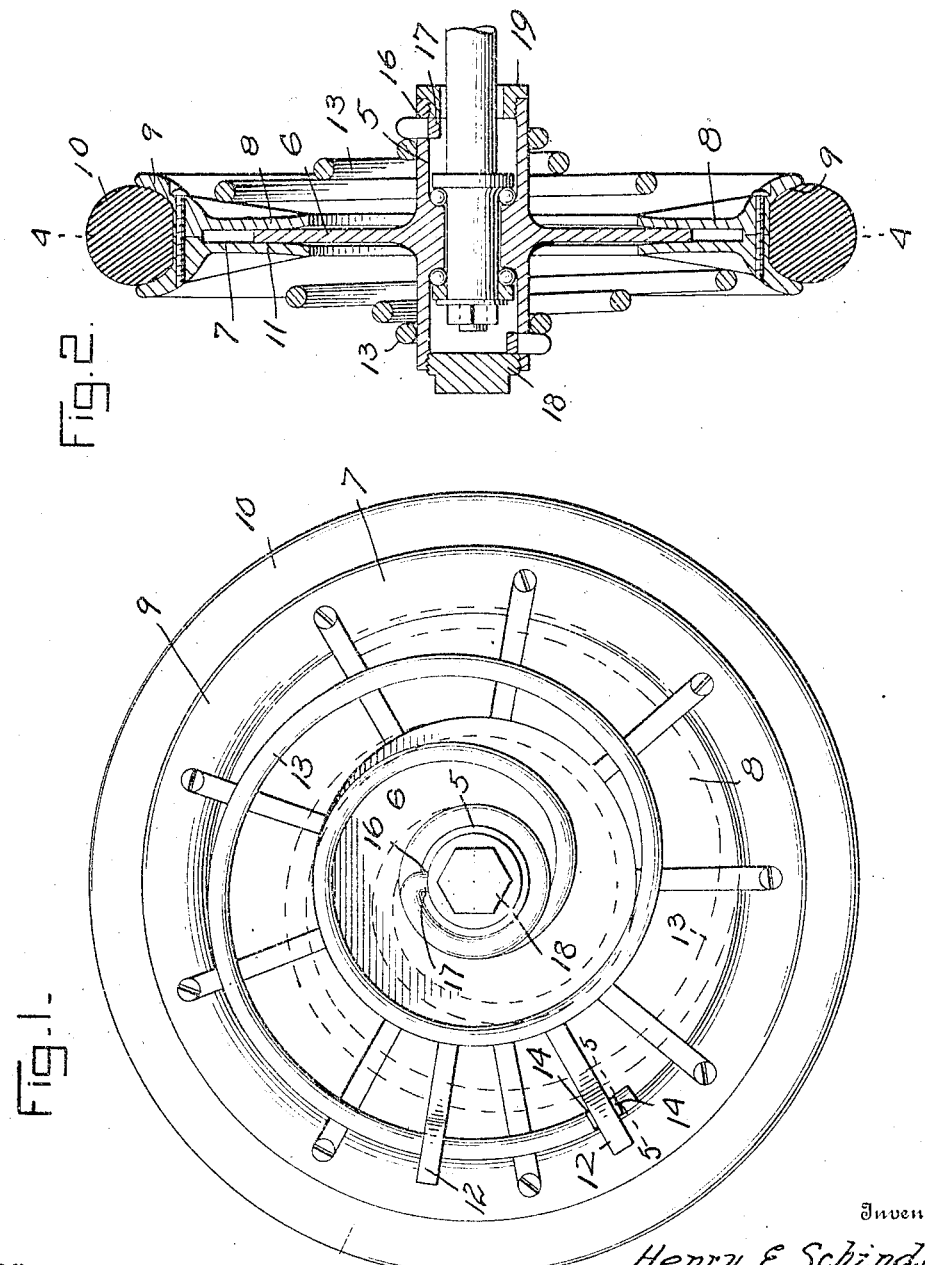
Witnesses
G. R. Thomas
H. Ella Autuey
Inventor
Henry E. Schindler
By
Attorneys No. 882,348. PATENTED MAR. 17, 1908.
H. E. SCHINDLER.
SPRING WHEEL.
APPLICATION FILED JULY 6, 1907.

2 SHEETS—SHEET 2

Witnesses
G. R. Thomas

Inventor
Henry E. Schindler
By
Attorneys

UNITED STATES PATENT OFFICE.

HENRY E. SCHINDLER, OF SISSETON, SOUTH DAKOTA.

SPRING-WHEEL.

No. 882,348.　　　Specification of Letters Patent.　　　Patented March 17, 1908.

Application filed July 6, 1907. Serial No. 382,468.

*To all whom it may concern:*

Be it known that I, HENRY E. SCHINDLER, a citizen of the United States, residing at Sisseton, in the county of Roberts, State of South Dakota, have invented certain new and useful Improvements in Spring-Wheels; and I do hereby declare the following to be a full, clear, and exact description of the invention, such as will enable others skilled in the art to which it appertains to make and use the same.

The present invention relates to improvements in spring-wheels, and it aims to provide an efficient and durable device of that nature designed especially for motor vehicles, the essential feature of the invention consisting of a hub yieldingly mounted between the spaced plates which comprise the web of the wheel, whereby the wheel may give when subjected to pressure.

The invention further consists in the construction, combination, and arrangement of parts, all as hereinafter more fully described, specifically claimed, and illustrated in the accompanying drawings, in which like parts are designated by corresponding reference numerals in the several views.

Figure 3:
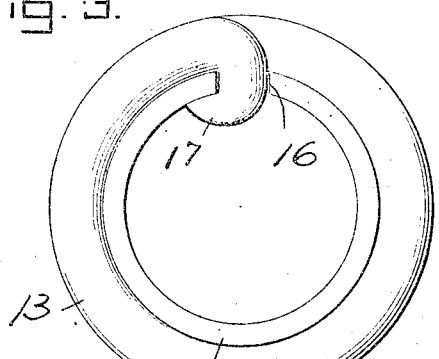
Figure 5:
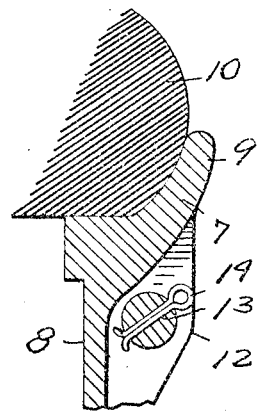

Of the said drawings—Figure 1 is a front elevation of a wheel constructed in accordance with the present invention. Fig. 2 is a section taken axially therethrough. Fig. 3 is an enlarged detail view showing the manner in which the inner end of each spring is fastened to the hub. Fig. 4 is a section on the line 4—4 of Fig. 2. Fig. 5 is a section on the line 5—5 of Fig. 1.

In Fig. 1, the spring upon the opposite side of the wheel is shown in dotted lines.

In its practical embodiment, the wheel includes a hollow cylindrical hub 5, having a vertically disposed circumferential flange 6 formed thereon intermediate its ends, and a web 7, which latter consists of a pair of annular plates 8, the outer periphery of each plate being flanged to form part of the felly 9 in which the tire 10 is fitted. Towards their inner peripheries, said plates are bowed in opposite directions, to provide an internal chamber 11 for the reception of the hub flange 6, the opposite ends of the hub projecting through the central openings in said plates, which are of sufficient diameter to enable the opposite faces of said flange to be visible therethrough. Each plate is further provided adjacent its outer periphery with a pair of spaced ears 12 having alining perforations formed therethrough for the reception of the outer end of a heavy coil-spring 13 which is held in place at such point by a pair of split pins 14 disposed on opposite sides of one ear and fitted in openings formed through the spring. The inner end of each spring extends through a notch 16 formed in the adjacent end of the hub, and terminates in a laterally bent portion 17 which thus prevents a direct withdrawal of said end from the hub, the opposite ends of which latter are closed by a pair of threaded plugs 18 and 19 against whose inner faces the bent portions of the spring ends bear. Each plug is provided with a polygonal shoulder which projects slightly beyond the corresponding end of the hub, and is adapted to be engaged by a wrench or similar tool. The plug 19 on the inner side of the wheel is, in addition, provided with a central opening through which the adjacent end of the axle of the vehicle extends, the interior of the hub having a race formed therein in which the usual anti-friction bearings are disposed.

The springs 13 above referred to are reversely wound with respect to each other and the pair of ears formed upon one plate is, in consequence, disposed diametrically opposite that formed upon the other plate, the notches through which the inner ends of the springs extend having a similar arrangement.

Owing to the fact that the diameter of the chamber 11 formed by the web-plates is considerably greater than that of the hub flange 6 which is fitted therein, the web is capable of an independent movement bodily with respect to the hub and axle of the wheel, whereby the latter will yield when the vehicle is traveling over a rough road, thus coöperating with and assisting the springs proper with which the vehicle is provided. The life of the tire which is attached to the felly of the wheel is likewise materially increased by reason of the yielding mounting of the wheel.

What is claimed, is,

A wheel comprising a web portion consisting of a pair of annular plates secured together, said plates having their outer peripheries flanged to form a felly, and their inner peripheries bowed outwardly in opposite directions to form an internal chamber; a hollow cylindrical hub yieldingly mounted with respect to said web and provided with a circumferential flange disposed within said chamber, each end of said hub being internally threaded and provided with a notch; a threaded plug fitted in each end of said hub; and a pair of coil-springs disposed upon opposite sides of said web and reversely wound with respect to each other, each spring having one end fastened to the adjacent plate and having its other end extending through the notch in the adjacent end of the hub into the interior thereof.

In testimony whereof, I affix my signature, in presence of two witnesses.

HENRY E. SCHINDLER.

Witnesses:
L. WM. FOSS,
SUSIE J. HILL.